United States Patent [19]

Ishikawa et al.

[11] Patent Number: 5,625,025
[45] Date of Patent: Apr. 29, 1997

[54] HEAT RESISTANT SILICONE COMPOSITIONS

[75] Inventors: Hiroki Ishikawa; Tsutomu Naganawa; Isao Ona, all of Chiba Prefecture, Japan

[73] Assignee: Dow Corning Toray Silicone Co., Ltd., Tokyo, Japan

[21] Appl. No.: 391,983

[22] Filed: Feb. 21, 1995

[30] Foreign Application Priority Data

Feb. 22, 1994 [JP] Japan ..................................... 6-049847

[51] Int. Cl.$^6$ .......................... C08G 77/26; C10M 107/50
[52] U.S. Cl. .......................... 528/38; 524/837; 524/864; 508/204; 508/209
[58] Field of Search ..................... 528/38; 524/837, 524/864; 106/287.11; 252/8.8, 495, 515 R; 508/204, 209

[56] References Cited

U.S. PATENT DOCUMENTS

| | | | |
|---|---|---|---|
| 4,430,235 | 2/1984 | Chu et al. | 252/49.6 |
| 4,537,691 | 8/1985 | Mori et al. | 252/49.6 |
| 4,879,378 | 11/1989 | Foster | 556/439 |
| 4,891,398 | 1/1990 | Tanaka et al. | 524/731 |
| 5,292,850 | 3/1994 | Pallini et al. | 528/32 |
| 5,310,616 | 5/1994 | Akamatsu | 430/110 |

FOREIGN PATENT DOCUMENTS

| | | |
|---|---|---|
| 2073893 | 3/1990 | Japan. |
| 5024047 | 2/1993 | Japan. |
| 6248183 | 9/1994 | Japan. |

OTHER PUBLICATIONS 3-227206 (227,206/91) Abstract only.

*Primary Examiner*—Ralph H. Dean
*Attorney, Agent, or Firm*—Timothy J. Troy

[57] ABSTRACT

The present invention relates to a silicone composition comprising a mixture of (A) an amino-functional diorganopolysiloxane oil free of phenol groups and having at least 1 amino group per molecule and (B) a diorganopolysiloxane oil free of amino groups and having at least 1 phenol group per molecule. The silicone composition has a viscosity of from 10 to 100,000 mm$^2$/s at 25° C. and an average phenol equivalent weight of 10,000 to 5,000,000. The silicone compositions of the present invention are highly heat-resistant, exhibit excellent release properties, and superior lubrication properties.

24 Claims, No Drawings

HEAT RESISTANT SILICONE COMPOSITIONS

BACKGROUND OF THE INVENTION

The present invention relates to highly heat-resistant silicone compositions that exhibit excellent release and lubrication properties.

Diorganopolysiloxane oils possess an excellent heat resistance and excellent release properties, and for this reason have heretofore been widely used as mold-release agents in the molding of thermoplastic resins, thermosetting resins, and rubbers and as release agents for toners used in electrostatic copiers. However, the application of diorganopolysiloxane oils as mold-release agents is not without its problems. Thus, dimethylpolysiloxane oils, which are typical of the diorganopolysiloxane oils under consideration, undergo a gradual thermal decomposition in this application when the temperature of the mold surface reaches approximately 150° C., and undergo a relatively rapid thermal decomposition when the mold surface temperature reaches 200° C. or more. This decomposition yields a sticky gel. The accumulation of this gel during the long-term use of dimethylpolysiloxane oil as a mold-release agent can prevent the fabrication of moldings with smooth surfaces, and the production of this gel is fatal when a mirror-like smoothness is required of the molding surface. Thermal decomposition is also a problem with the use of dimethylpolysiloxane oil as a toner release agent in high-speed xerographic copiers since the hot rolls in these machines are used at temperatures around 200° C. Moreover, the contemporary trend is toward substantially higher mold temperatures in pursuit of more productive molding operations and substantially higher hot roll temperatures in copiers in pursuit of shorter copy times. This has led to demand for release agents with even greater thermal stabilities. One such release agent has been proposed by Japanese Patent Application Laid Open No. 3-227206 (227,206/91), which teaches an amino-functional diorganopolysiloxane oil that has an amino equivalent weight in the range of 10,000 to 100,000.

When heated, however, amino-functional diorganopolysiloxane oils of this type will emit an ammonia odor or will discolor, and it may also gel when subjected to long-term heating. As a result, its performance as a high-temperature release agent or lubricant is not entirely satisfactory.

SUMMARY OF THE INVENTION

The inventors have discovered that mixtures of amino-functional diorganopolysiloxane oils with phenol-functional diorganopolysiloxane oils exhibit outstanding heat resistance, release properties, and lubricity when the average phenol equivalent weight of the mixtures falls in a particular range.

It is an object of the present invention to produce a silicone composition which exhibits excellent heat resistance, release properties, and lubricity.

DETAILED DESCRIPTION OF THE INVENTION

The present invention relates to a silicone composition comprising (A) 100 weight parts of an amino-functional diorganopolysiloxane oil free of phenol groups and (B) 0.001 to 1.000 weight parts of a diorganopolysiloxane oil free of amino groups and having at least 1 phenol group per molecule wherein the viscosity of said composition is from 10 to 100,000 mm²/s at 25° C. and the average phenol equivalent weight of said composition is 10,000 to 5,000,000.

Component (A) in the silicone compositions of the invention may be any amino-functional diorganopolysiloxane oil (i) having at least 1 amino group in each molecule and (ii) not containing a phenol group. The amino groups of (A) are exemplified by groups having the formula:

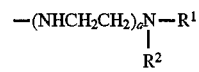

wherein $R^1$ and $R^2$ are independently selected from a hydrogen atom or a monovalent hydrocarbon group having from 1 to 20 carbon atoms. The groups $R^1$ and $R^2$ may be the same or different as desired. The monovalent hydrocarbon groups are exemplified by methyl, ethyl, propyl, phenyl, and cyclohexyl. The subscript a can have a value of 0 to 10, but is preferably 0 or 1. Thus preferred amino groups include $-NH_2-NHC_2H_4NH_2$, $-N(CH_3)(C_2H_5)$, and

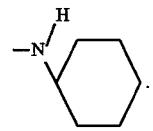

The amino-functional diorganopolysiloxane oils of (A) are exemplified by a diorganopolysiloxane oil having its average formula selected from the group consisting of:

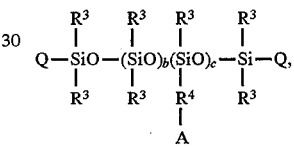

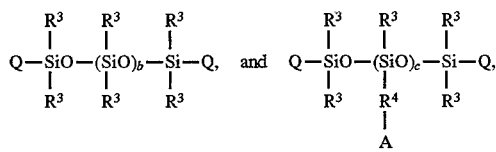

wherein each $R^3$ independently denotes a monovalent hydrocarbon group, $R^4$ denotes a divalent hydrocarbon group, A denotes an amino group, Q is selected from $R^3$ or a group having the formula $-R^4-A$, b has a value of at least one, c has a value of at least 1 with the proviso that there is at least 1 amino group per molecule.

The group $R^3$ is specifically exemplified by alkyl groups such as methyl, ethyl, propyl, hexyl, and octyl; alkenyl groups such as vinyl, allyl, and hexenyl; aryl groups such as phenyl; arylalkylene groups such as

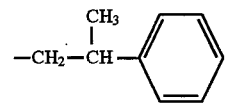

and substituted hydrocarbon groups such as 3,3,3-trifluoropropyl. It is preferred that $R^3$ is methyl. The divalent hydrocarbon group of $R^4$ is exemplified by ethylene, propylene, butylene, and isobutylene. The group A in the preceding formula is an amino group as exemplified hereinabove. The group Q in the preceding formula is selected from $R^3$ and groups having the formula $-R^4-A$ wherein $R^4$ and A are as defined as hereinabove.

Preferred as (A) are amino-functional diorganopolysiloxane oils having the formula:

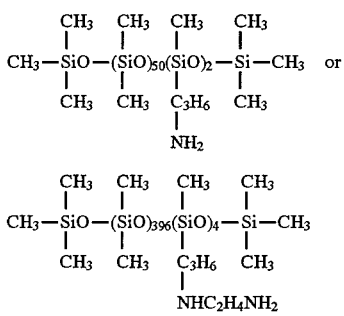

The viscosity of component (A) at 25° C. will generally fall in the range of 10 to 100,000 mm²/s.

The diorganopolysiloxane oil comprising component (B) functions to improve the heat resistance and thereby inhibits the viscosity increase and gelation that would otherwise result from heating. This component: must contain at least 1 phenol group in each molecule and must not contain amino groups.

The phenol-functional diorganopolysiloxane oils of (B) are exemplified by a diorganopolysiloxane oil having its average formula selected from the group consisting of:

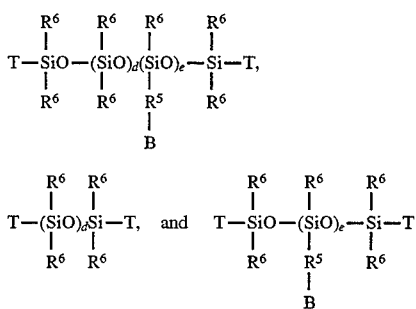

wherein each $R^6$ independently denotes a monovalent hydrocarbon group, $R^5$ denotes a divalent hydrocarbon group as described hereinabove, B denotes a phenol group, T is selected from $R^6$ or a group having the formula —$R^5$—B, d has a value of at least one, e has a value of at least 1 with the proviso that there is at least 1 phenol group per molecule.

The divalent hydrocarbon groups of $R^5$ are exemplified by alkylene groups such as ethylene, propylene, butylene, and isobutylene, and by alkylenearylene groups such as —(CH$_2$)$_2$—C$_6$H$_4$—. It is preferred that $R^5$ is propylene. The hydroxyl group in the phenolic moiety may be bonded at the ortho, meta, or para position. The group $R^6$ may be substituted and unsubstituted monovalent hydrocarbon groups exemplified by alkyl groups such as methyl, ethyl, propyl, hexyl, and octyl; alkenyl groups such as vinyl, allyl, and hexenyl; aryl groups such as phenyl; arylalkylene groups such as

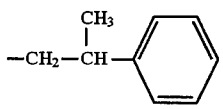

and substituted hydrocarbon groups such as 3,3,3-trifluoropropyl. Other groups suitable as $R^6$ include carboxyl-functional monovalent hydrocarbon groups having the formula —(CH$_2$)$_x$—COOH wherein x is an integer with a value of at least 1, hydroxyl-functional monovalent hydrocarbon groups having the formula —(CH$_2$)$_x$—OH wherein x is an integer with a value of at least 1, oxyalkylene-containing monovalent hydrocarbon groups having the formula —C$_3$H$_6$O—(C$_2$H$_4$O)$_x$H wherein x is an integer with a value of at least 1, and mercapto-functional monovalent hydrocarbon groups with the formula —(CH$_2$)$_x$—SH wherein x is an integer with a value of at least 1. The average phenol equivalent weight of component (B) should generally be in the range of 500 to 8,000 and is preferably 1,000 to 5,000. Component (B) preferably has a viscosity of 20 to 50,000 mm²/s at 25° C. and more preferably 50 to 10,000 mm²/s. The diorganopolysiloxane oil comprising this component is readily prepared, for example, by an addition reaction between an SiH-containing diorganopolysiloxane oil and p-vinylphenol or p-allylphenol in the presence of an addition-reaction catalyst such as chloroplatinic acid. The general range of addition of component (B) is 0.001 to 1,000 weight parts per 100 weight parts component (A).

The silicone compositions according to the present invention comprise mixtures of components (A) and (B) whose average phenol equivalent weight is 10,000 to 5,000,000 and whose viscosity at 25° C. is 10 to 100,000 mm²/s. When the average phenol equivalent weight is below 10,000, a large amount of intermolecular crosslinking will occur at high temperatures and gelation will then occur quite readily. A phenol group-induced improvement in thermal stability is no longer observed when the average phenol equivalent weight exceeds 5,000,000. The preferred range for the average phenol equivalent weight is 50,000 to 2,000,000, and the preferred range for the viscosity is 10 to 50,000 mm²/s at 25° C.

The silicone compositions according to the invention are prepared simply by mixing the specified quantities of components (A) and (B) to homogeneity at room temperature. For example, homogeneously mixing 10 weight parts of a diorganopolysiloxane oil (B) having an average phenol equivalent weight of 2,000 into 90 weight parts amino-functional diorganopolysiloxane oil (A) yields a diorganopolysiloxane oil with an average phenol equivalent weight of 20,000. A diorganopolysiloxane oil with an average phenol equivalent weight of 200,000 can be prepared by homogeneously mixing 10 weight parts diorganopolysiloxane oil (B) having an average phenol equivalent weight of 2,000 into 990 weight parts amino-functional diorganopolysiloxane oil (A).

While the silicone compositions of the invention comprise mixtures of components (A) and (B) as described above, optional ingredients may also be added as long as the object of the invention is not impaired. Suitable optional ingredients for addition to the silicone compositions of this invention include inorganic powders such as mica, talc, zinc oxide, and calcium carbonate; organic compounds such as paraffin and wax; organic solvents such as toluene, xylene, hexane, heptane, 1,1,1-trichloroethane, and 1,1,2,2-tetrachloroethane; nonionic surfactants such as polyoxyalkylene alkyl ethers, polyoxyalkylene alkylphenyl ethers, polyoxyalkylene alkyl esters, polyoxyalkylene sorbitan alkyl esters, sorbitan alkyl esters, polyethylene glycol, and polypropylene glycol; cationic surfactants such as octyltrimethylammonium hydroxide, dodecyltrimethylammonium hydroxide, hexadecyltrimethylammonium hydroxide, octyldimethylbenzylammonium hydroxide, decyldimethylammonium hydroxide, didodecyldimethylammonium hydroxide, dioctadecyldimethylammonium hydroxide, beef tallow trimethylammonium hydroxide, and cocotrimethylammonium hydroxide; and anionic surfactants such as dodecylbenzenesulfonate and the salts of higher alcohol sulfate esters.

The silicone compositions of the invention have a very good heat resistance, and this particular feature makes the compositions of the invention highly qualified for application as mold-release agents in rubber and plastic moldings, as a toner release agent for use in copiers, as a synthetic fiber lubricant, for example, as a lubricant for finish-free yarn, false-twisted yarn, finish-free carbon fiber, or finish-free tire cord yarn, and as a thermal medium.

To prepare the silicone compositions of the invention for use as a mold-release agent, a mixture of components (A) and (B) is first diluted with an organic solvent (e.g., toluene, xylene, etc.) or is emulsified with water and surfactant and then further diluted with water, and a small amount of the resulting dilution is sprayed uniformly over the mold. Emulsification is generally carried out by blending 5 to 30 weight parts surfactant per 100 weight parts of the mixture of (A) and (B). The water is added in a quantity which will give a mixture content of preferably 5 to 60 weight % and more preferably 10 to 50 weight % in the formulation.

The mixture of components (A) and (B) can frequently be used neat, i.e., without re-formulation, when the silicone compositions of the invention are employed as a release agent for copier toner.

With respect to use of the silicone compositions of this invention as a lubricant for synthetic fibers, the mixture of components (A) and (B) can be used neat, diluted with an organic solvent, or emulsified using water and surfactant. The neat mixture may be employed by uniform application to the fiber using, for example, rollers. As used here, fiber refers to a continuous filament yarn, spun yarn, or tow. The emulsions are typically applied to the fiber by kiss-roll techniques or by continuously running the fiber through the emulsion. The emulsions may be used after further dilution with water as desirable. The mixture add-on to the synthetic fiber preferably falls in the range of 0.2 to 2.0 weight %.

In the examples delineated hereinbelow, "part" denotes "weight part" and the viscosity is the value measured at 25° C.

EXAMPLE 1

To 288 parts of an amino-functional diorganopolysiloxane having a viscosity of about 1,190 mm²/s, an amino equivalent weight of about 3,800, and the average formula:

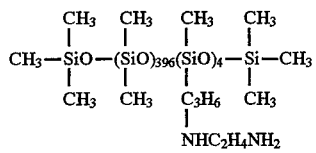

was added 12 parts of a diorganopolysiloxane having a viscosity of about 255 mm²/s, an average phenol equivalent weight of about 3,900, and the average formula:

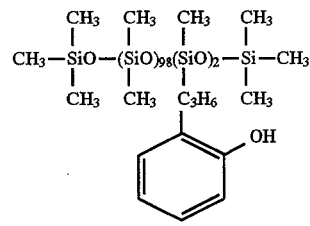

Mixing the above to homogeneity yielded a transparent diorganopolysiloxane oil with a viscosity of 1,090 mm²/s and an average phenol equivalent weight of 100,000. This diorganopolysiloxane oil was submitted to measurement of its heat resistance, release performance, and molding surface condition using the following methods. These results are reported in Table I, which also reports a general evaluation of the diorganopolysiloxane oil as a mold-release agent.

Heat Resistance was evaluated as follows:

The diorganopolysiloxane oil product (2 g) was placed in an aluminum cup (diameter=5 cm, depth=2 cm) and held in a hot-air drier at 150° C. The appearance was evaluated after specified time periods (0.5, 1, 2, and 3 hours), and the heat resistance was evaluated on the following scale:

++: denotes excellent (completely free of an increase in viscosity; also, no appearance of gelation).

+: denotes fair (a thin film has formed on the surface, but the interior is still fluid).

x: denotes poor (completely gelled, the entire mass has become rubbery).

Mold-release performance and the molding surface condition was evaluated as follows:

The diorganopolysiloxane oil product was painted on a steel mold (mirror finish) designed for the molding of a 25×25×0.5 cm rubber specimen. After first heating at 150° C. for 2 hours and then cooling, the treated mold was immersed in a bath of toluene solvent and cleaned by gentle shaking. Unvulcanized styrene/butadiene copolymer rubber was then filled into the mold, and a molding was fabricated by vulcanization for 15 minutes at 150° C. under 20 kg/cm² pressure. The quality of the release of this molding from the mold was evaluated and is reported below as the "release performance".

In addition, the surface condition of the molding was visually inspected in order to determine whether the surface was mirror-like or rough. The nature of the adhesion by the diorganopolysiloxane oil on the molding surface was also evaluated.

Comparative Example 1

The amino-functional diorganopolysiloxane of Example 1 was evaluated for heat resistance, release performance, and molding surface condition as in Example 1. These results are reported in Table I, which also reports a general evaluation of this amino-functional diorganopolysiloxane as a mold-release agent.

Comparative Example 2

The phenol-functional diorganopolysiloxane of Example 1 was submitted to an evaluation of heat resistance, release performance, and molding surface condition as in Example 1. These results are reported in Table I, which also reports a general evaluation of this diorganopolysiloxane as a mold-release agent.

TABLE I

|  | Example 1 | Comparative Example 1 | Comparative Example 2 |
|---|---|---|---|
| Heat Resistance |  |  |  |
| 0.5 hr | ++ | + | + |
| 1 hr | ++ | x | +-x |
| 2 hr | ++ | x | x |
| 3 hr | ++ | x | x |
| Release | excellent | excellent | excellent |

TABLE I-continued

|  | Example 1 | Comparative Example 1 | Comparative Example 2 |
| --- | --- | --- | --- |
| Performance Molding Surface Condition | mirror smooth, glossy trace quantity of diorgano- polysiloxane oil, adhered uniformly over the surface | rough and dull gel adhered over part of the surface | rough and dull gel adhered over part of the surface |
| General Evaluation | excellent | poor | poor |

EXAMPLE 2

About 96 parts of an amino-functional diorganopolysiloxane having a viscosity of about 298 mm²/s, an amino equivalent weight of about 127,000, and having the average formula:

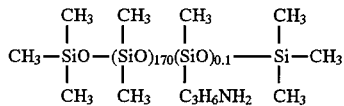

and about 4 parts of a phenol-functional diorganopolysiloxane having a viscosity of about 252 mm²/s, an average phenol equivalent weight of about 3,900, and having the average formula

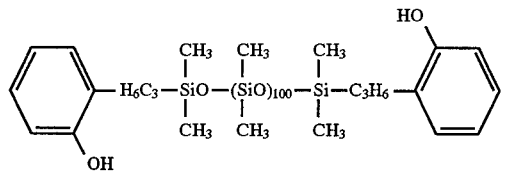

were combined and mixed to homogeneity to yield a diorganopolysiloxane oil having a viscosity of about 294 mm²/s and an average phenol equivalent weight of about 100,000. Two drops of this diorganopolysiloxane oil were dripped onto a clean polyester film (having a length of about 21 cm, a width of about 30 cm, and a thickness of about 100 micrometers) and uniformly spread out using gauze to yield a diorganopolysiloxane oil-coated polyester film. About 1.0 g of black copier-grade toner was uniformly sprinkled onto the treated polyester film, and white A4 copier-grade paper was then placed on the polyester film. Using a press, this assembly was pressed at 5 kg/cm² and 110° C. for 5 minutes. The assembly was then released from the press and the polyester film was peeled from the copier-grade white paper. The two components were readily separable even without the application of force. All of the toner had been transferred to the copier-grade white paper, and absolutely no toner was observed adhering on the polyester film. These results confirmed that this diorganopolysiloxane oil was highly qualified for use as a toner release agent.

Comparative Example 3

Using the procedure of Example 2, copier-grade white paper was pressed using a press against polyester film as described in Example 2, in this case without application of the diorganopolysiloxane oil. When the attempt was made to peel the copier-grade white paper from the polyester film after release from the press, peeling proved to be completely impossible, with the paper adhering so strongly that it was torn.

EXAMPLE 3

About 18.5 parts of an amino-functional diorganopolysiloxane having a viscosity of about 302 mm²/s, an amino equivalent weight of about 63,000, and having the average formula:

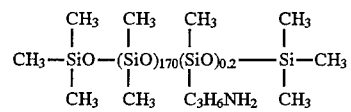

and 1.5 parts of a diorganopolysiloxane having a viscosity of about 255 mm²/s, an average phenol equivalent weight of about 3,900, and having the average formula:

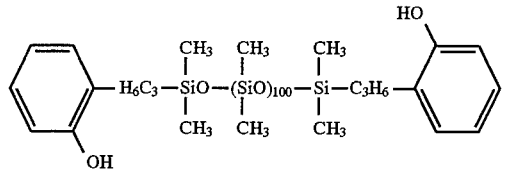

were combined and mixed to homogeneity to yield a diorganopolysiloxane oil having a viscosity of about 300 mm²/s and an average phenol equivalent weight of about 52,000. About 2 g of this diorganopolysiloxane oil was placed in an aluminum cup having a diameter of about 5 cm and a depth of about 2 cm, and its appearance was evaluated during holding the cup in a forced convection oven at 250° C. The diorganopolysiloxane oil did not gelled and retained its fluidity even after 5 hours, which confirmed that it had an excellent heat resistance.

Comparative Example 4

The appearance of the amino-functional diorganopolysiloxane referenced in Example 3 was evaluated by holding 2 g of this material in an oven according to the procedure described in Example 3. In this case, the amino-functional diorganopolysiloxane had gelled after 5 hours.

That which is claimed is:

1. A silicone composition comprising:

(A) 100 weight parts of an amino-functional diorganopolysiloxane oil free of phenol groups; and (B) 0.001 to 1,000 weight parts of a diorganopolysiloxane oil free of amino groups and having at least 1 phenol group per molelcule wherein the viscosity of said composition is from 10 to 100,000 mm²/s at 25° C. and the average phenol equivalent weight of said composition is 10,000 to 5,000,000.

2. A composition according to claim 1, wherein (A) is a diorganopolysiloxane oil having its average formula selected from the group consisting of:

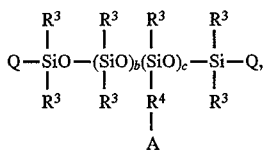

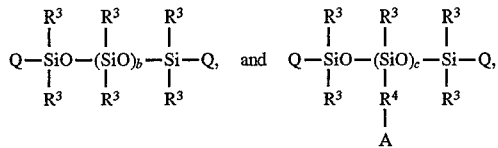

wherein each $R^3$ independently denotes a monovalent hydrocarbon group, $R^4$ denotes a divalent hydrocarbon group, A denotes an amino group, Q is selected from $R^3$ or a group having the formula —$R^4$—A, b has a value of at least one, c has a value of at least 1 with the proviso that there is at least 1 amino group per molecule.

3. A composition according to claim 2, wherein $R^3$ is selected from the group consisting of alkyl groups, alkenyl groups, and arylalkylene groups.

4. A composition according to claim 2, wherein $R^3$ is selected from the group consisting of methyl, ethyl, propyl, hexyl, octyl, vinyl, allyl, hexenyl, phenyl, and 3,3,3-trifluoropropyl.

5. A composition according to claim 2, wherein $R^4$ is selected from the group consisting of ethylene, propylene, butylene, and isobutylene.

6. A composition according to claim 2, wherein the amino group is a group having the formula:

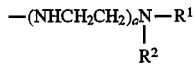

wherein $R^1$ and $R^2$ are independently selected from a hydrogen atom or a monovalent hydrocarbon group having from 1 to 20 carbon atoms and a has a value of 0 to 10.

7. A composition according to claim 6, wherein $R^1$ and $R^2$ are each selected from the group consisting of methyl, ethyl, propyl, phenyl, and cyclohexyl.

8. A composition according to claim 1, wherein (A) is an amino-functional diorganopolysiloxane oil having its formula selected from:

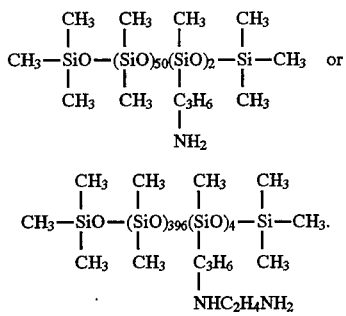

9. A composition according to claim 1, wherein (B) is a diorganopolysiloxane oil having its average formula selected from the group consisting of:

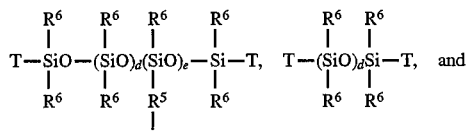

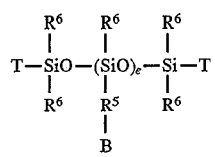

wherein each $R^6$ independently denotes a monovalent hydrocarbon group, $R^5$ denotes a divalent hydrocarbon group, B denotes a phenol group, T is selected from $R^6$ or a group having the formula —$R^5$—B, d has a value of at least one, e has a value of at least 1 with the proviso that there is at least 1 phenol group per molecule.

10. A composition according to claim 9, wherein $R^6$ is selected from the group consisting of alkyl groups, alkenyl groups, arylalkylene groups, carboxyl-functional monovalent hydrocarbon groups having the formula —$(CH_2)_x$—COOH, hydroxyl-functional monovalent hydrocarbon groups having the formula —$(CH_2)_x$—OH, oxyalkylene-containing monovalent hydrocarbon groups having the formula —$C_3H_6O$—$(C_2H_4O)_xH$ and mercapto-functional monovalent hydrocarbon groups with the formula —$(CH_2)_x$—SH, wherein x is an integer with a value of at least 1.

11. A composition according to claim 9, wherein $R^6$ is selected from the group consisting of methyl, ethyl, propyl, hexyl, octyl, vinyl, allyl, hexenyl, phenyl, and 3,3,3-trifluoropropyl.

12. A composition according to claim 9, wherein $R^5$ is selected from the group consisting of ethylene, propylene, butylene, and isobutylene.

13. A composition according to claim 1, wherein the composition further comprises an organic solvent.

14. A composition according to claim 13, wherein the organic solvent is selected from the group consisting of toluene, xylene, hexane, heptane, 1,1,1-trichloroethane, and 1,1,2,2-tetrachloroethane.

15. A composition according to claim 1, wherein the composition further comprises surfactants and water.

16. A composition according to claim 15, wherein the surfactant is selected from the group consisting of nonionic surfactants, cationic surfactants, and anionic surfactants.

17. A composition according to claim 15, wherein the surfactants are selected from the group consisting of polyoxyalkylene alkyl ethers, polyoxyalkylene alkylphenyl ethers, polyoxyalkylene alkyl esters, polyoxyalkylene sorbitan alkyl esters, sorbitan alkyl esters, polyethylene glycol, polypropylene glycol, octyltrimethylammonium hydroxide, dodecyltrimethylammonium hydroxide, hexadecyltrimethylammonium hydroxide, octyldimethylbenzylammonium hydroxide, decyldimethylammonium hydroxide, didodecyldimethylammonium hydroxide, dioctadecyldimethylammonium hydroxide, beef tallow trimethylammonium hydroxide, cocotrimethylammonium hydroxide, dodecylbenzenesulfonate, and salts of higher alcohol sulfate esters.

18. A method of treating a substrate, the method comprising the step of:
(I) applying a mixture of:
 (A) 100 weight parts of an amino-functional diorganopolysiloxane oil free of phenol groups; and
 (B) 0.001 to 1,000 weight parts of a diorganopolysiloxane oil free of amino groups and having at least 1 phenol group per molecule wherein the viscosity of said composition is from 10 to 100,000 mm$^2$/s at 25° C. and the average phenol equivalent weight of said composition is 10,000 to 5,000,000 to a substrate.

19. A method according to claim 18, wherein the method further comprises heating the substrate.

20. A method according to claim 18, wherein the mixture of (I) further comprises an organic solvent.

21. A method according to claim 18, wherein the mixture of (I) further comprises surfactants and water.

22. A product produced in accordance with the method of claim 18.

23. A product produced in accordance with the method of claim 20.

24. A product produced in accordance with the method of claim 21.

* * * * *